United States Patent [19]

Ramsay

[11] Patent Number: 4,694,369
[45] Date of Patent: Sep. 15, 1987

[54] SEPARABLE WEB CONTAINER

[76] Inventor: Donald L. Ramsay, 6881 Hazard, Westminister, Calif. 92683

[21] Appl. No.: 711,742

[22] Filed: Mar. 14, 1985

[51] Int. Cl.⁴ .......................... G11B 23/02; G03B 1/04
[52] U.S. Cl. ...................................... 360/132; 242/199
[58] Field of Search ................ 360/132, 134, 137, 13; 242/197, 198

[56] References Cited

U.S. PATENT DOCUMENTS

| | | | |
|---|---|---|---|
| 3,861,621 | 1/1975 | Takeichi et al. | 242/197 |
| 4,083,472 | 4/1978 | Wharam | 360/132 X |
| 4,294,418 | 10/1981 | Gell | 242/197 |
| 4,312,021 | 1/1982 | Bolick, Jr. | 360/13 X |
| 4,367,963 | 1/1983 | Daughters | 242/197 X |

Primary Examiner—Stuart N. Hecker
Assistant Examiner—Alyssa H. Bowler
Attorney, Agent, or Firm—Norman L. Chalfin

[57] ABSTRACT

The invention herein discloses a separable web or ribbon container wherewith the web or ribbon remains within the separated container halves so that additions to or deletions from the web may be made without removing the spools on which the web is wound for transport back and forth between the halves.

4 Claims, 12 Drawing Figures

END OF SONG (CUT TAPE)

28
END OF SONG (A)
SPLICE
BEGINING OF SONG (B)

END OF SONG (CUT TAPE)

LEADER
END OF SONG (F)
SPLICE

SEPARABLE WEB CONTAINER

BACKGROUND OF THE INVENTION

In a number of fields, among them the field of sound or video recording, or motion picture photography, webs or elongated films are used on which to record the sound or images. In some applications of the sound, video, or motion picture films they are installed in cassettes in which a supply reel holds one end of the film or web rolled up on one side of the cassette, and a second reel on the other side of the cassette receives the other end of the web or film to be spooled up thereon as the first reel feeds the film or web to it. These prior art cassettes generally fully enclose the film or web and its reels so that, if additional web or film material must be added, or unwanted material removed, the top or bottom half of the cassette must be removed to gain access to the reeled up material. This is because such cassettes are fashioned in a clam-shell configuration.

There is always the danger of "spilling" the film web off the reel when attempting to add to the web or film, or delete material from it.

Many of the prior art cassettes are inaccessible for making editing changes by inserting or deleting portions of the web.

Some prior art separable cassette devices employ pairs of identical fully enclosed case-like devices each with a reel and the web or film running between them. They can be operated side by side. Others have two such assemblies interconnected with an enclosed slot to protect the film from light.

The reel to reel type of magnetic tape recorder for audio records has had a long history and was considered the state of the art until the advent of the audio cassette. The smaller size cassette with its convenience has become widely used.

As the technology of the smaller cassette advanced more uses were found in quality audio recording. They are used not only for music recording but also for teaching aids in, for example, language studies. A teacher may wish to modify a cassette audio tape to include specialized segments for particular students or classes. To do this with the conventional cassette requires disassembly of the cassette by separating the upper from the lower half, if they are at all disassemblable. The danger of spilling is constantly present since the spools or reels on which the webs or films are wound lie unprotected while the cassette is open.

One of the advantages in using reel-to-reel tape was in the ease with which it could be edited. An unwanted section could be removed and a new section inserted. Portions from one tape could be spliced conveniently on to another. Up to now the same covenience has not been experienced with the smaller cassette devices since the process most favored necessitated at least two recording machines to assemble material from different sources. It was necessary to copy the material from one cassette to another. This process results in quality deterioration with each successive re-recording. To splice-in tape sections in the prior art cassettes it was necessary to pull the web out of one of the head slots, cut the tape, and hope to make a good splice. Other techniques require the dissassembly of the cassette and the attendent danger of spilling the long web of tape because the reel spools are not supported when a conventional cassette is opened.

THE PRESENT INVENTION

The present invention contemplates a novel cassette case for elongated web magnetic tape records or other strip films of like nature in which a left half containing the supply spool and a ring half containing the take-up spool are mirror image halves with bayonet-like interfitting extensions that make it possible to snap apart the two halves so that the web or film is free and can be handled for splicing and editing as conveniently as if they were on the larger reel to reel tapes. The halves of one cassette assembly according to this invention would be interchangeable with the halves of any other cassette assembly made according to this invention. Thus one can assemble program material by splicing sections of such material from any one half section of cassette elements to any other half section because the sections of the cassette interfit with one another. The same process can be applied to videotape cassettes made in accordance with the invention described herein.

When a conventional cassette is being used for possible splicing, there is no way to monitor the material being inserted or deleted. With the present invention, each half of the cassette being spliced together may remain on the cassette turntable and the material played to check the exact point of splicing. Because of the nature of the halves according to this invention, cassette halves from an entirely different program or tape may be spliced onto any other cassette half making it possible to check what is being inserted or deleted as well as to establish the end points of either the source or target sections.

Accordingly, it is an object of the invention herein to provide a separable cassette assembly for tape or film webs in which the two halves thereof are identical and the halves are each so configured that they are mirror images of one another when assembled; each half has interfitting and interlocking tab arrangements making for easy separability and ready snap-together reassembly, and the halves of any one cassette, according to the invention, can be assembled to those of other similar casettes, thus providing means for assembling music, video, film or sound programs from many sources and modifying and reassembling selected sections of the programs at will.

This will become clear from the specification which follows and the appended claims taken together with the accompanying drawings.

IN THE DRAWINGS

As has been described hereinabove this invention consists of identical pairs of web cassette halves which are assembled in a mirror image configuration to one another. Either half cassette can be a left or a right part of the assembled cassette. The halves are held together by respective interfitting tab elements which fall into notches in the other half. The tab elements are resilient so as to snap into a matching notch of the other side. The halves are thus held securely together. The halves, however, are easily separated by pulling them apart against the resilient tabs which, upon the pressure of the pull, ride out of their respective notches.

Each of the halves of the cassette has a reel within on which a tape web can be spooled so that the web can be moved from the spool on one side to the spool on the other half while the halves are assembled together, or pulled out orrolled in while halves are separated.

Figure 1:
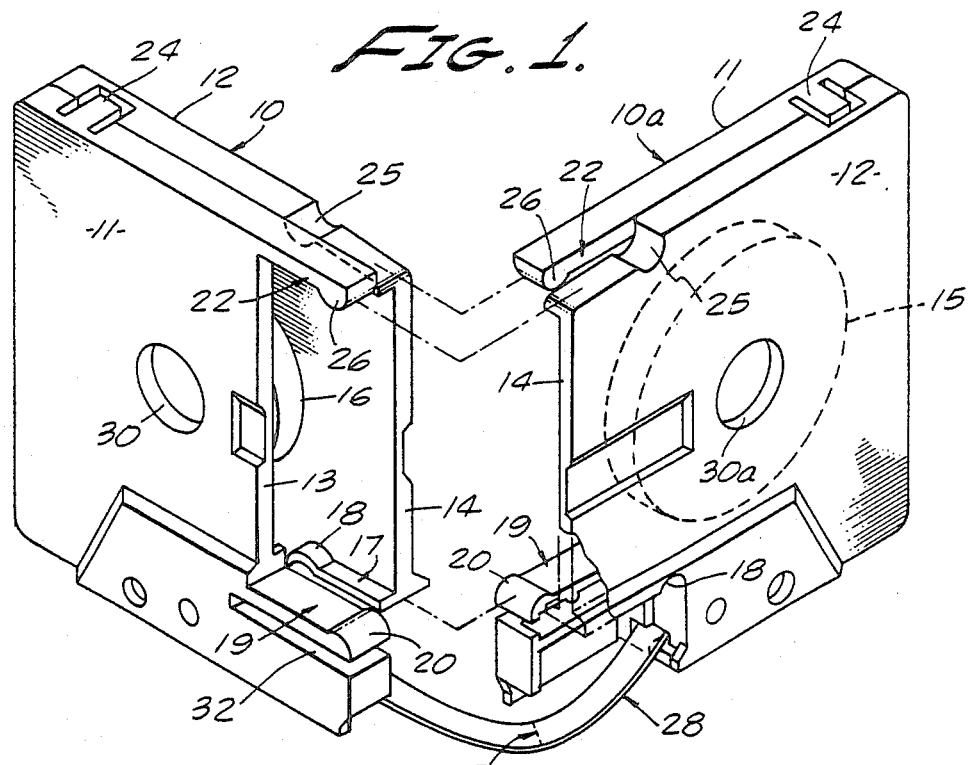
FIG. 1 is a perspective view of the separable magnetic web cassette according to this invention to reveal how the separable halves are related to one another.
Figure 2:
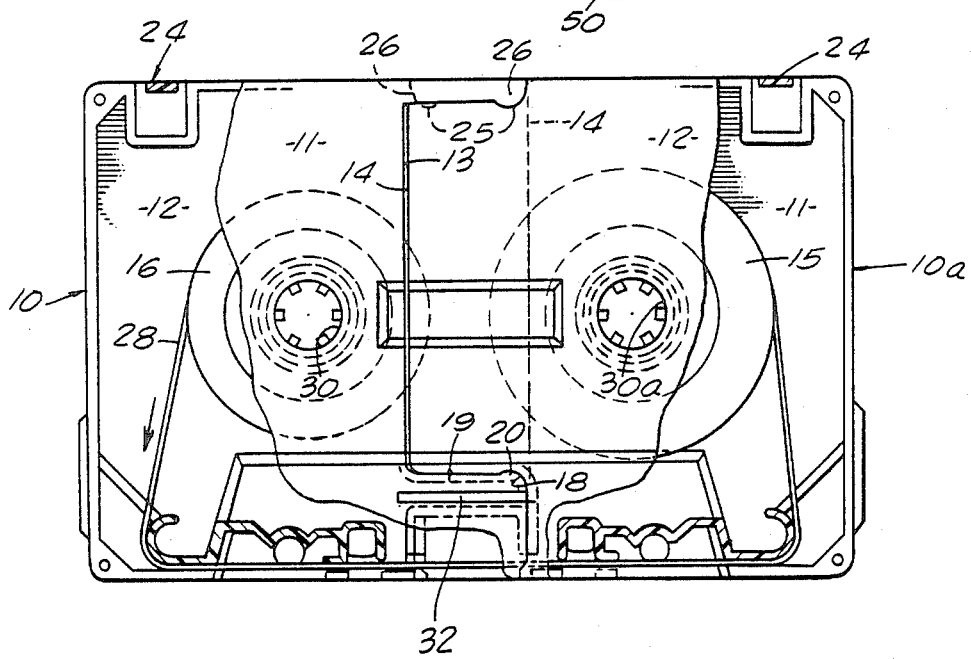
FIG. 2 is a front view of a cassette assembly according to this invention showing how the cassette halves are assembled when put together.

With reference to FIG. 1 the two identical halves 10 and 10a of a separable tape web cassette of this invention are shown separated and positioned at 90° with respect to one another so as to reveal the resilient inner tab elements 22,26 at the top of each cassette half which interfit with the respective notches 25 in the other half. Near the bottom of each cassette half there are shown resilient tab elements 19 and 20. Upward going semicircular extension 20 in one cassette half interfits with notch 18 of the elements 17,18. The upper tab element 22,26 of each cassette half consists of flat portion 22 with a downward semicircular extension 26, designed to fit into the corresponding semicircular notch 25 of the other cassette half. It should be noted that the face 11 of the cassette half at the left of the image in FIG. 1 is facing the observer. The face 11 on the right half of the image shown in FIG. 1 is away from the observer. The face 12 of the cassette half at the left of the image is away from the observer while on the right, the face 12 is toward the observer. The two halves 10 and 10a are in fact identical so that any pair of these identical units can be put together. When they are so assembled as shown in FIG. 2, semicircular extension 26 on tab 22 of one cassette half is engaged with the corresponding semicircular notch 25 in the other cassette half. Similarly, upward going semicircular extension 20 at the end of tab element 19,20 of one half cassette is engaged in the notch 18 of of the other cassette half. The halves are thus held together. The semicircular extensions hold in the notches, and end faces 13 and 14 (see FIG. 1) butt together. The slot 32 beneath resilient tab element 19,20 provides a clearance space for the tab element to move in during the engagement of element 20 on unit 10 in notch 18 on unit 10a.

Figure 3:
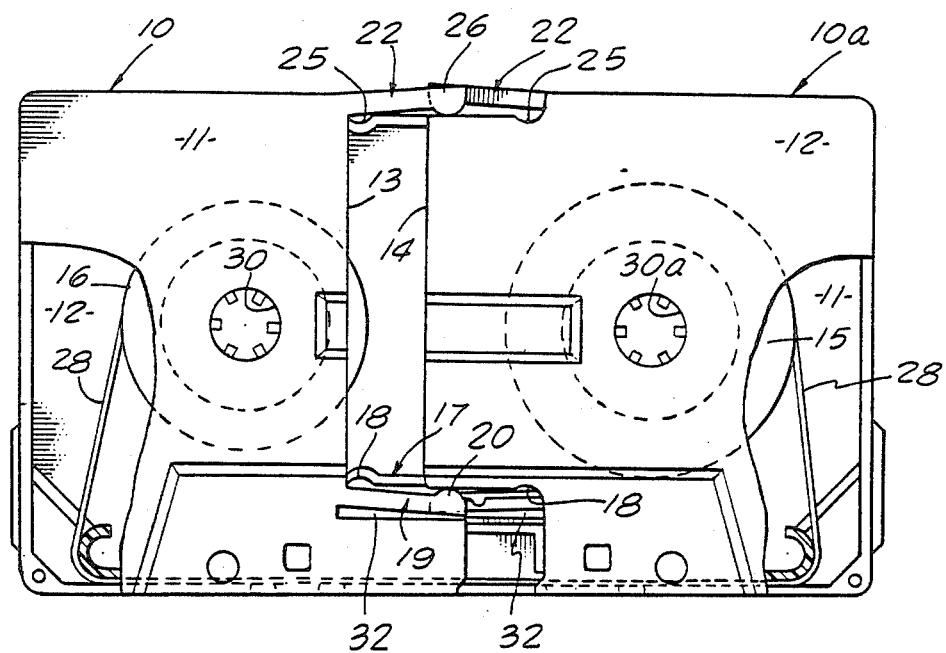
FIG. 3 is a view of the cassette according to this invention showing the first step in the separation of the halves thereof.
Figure 4:
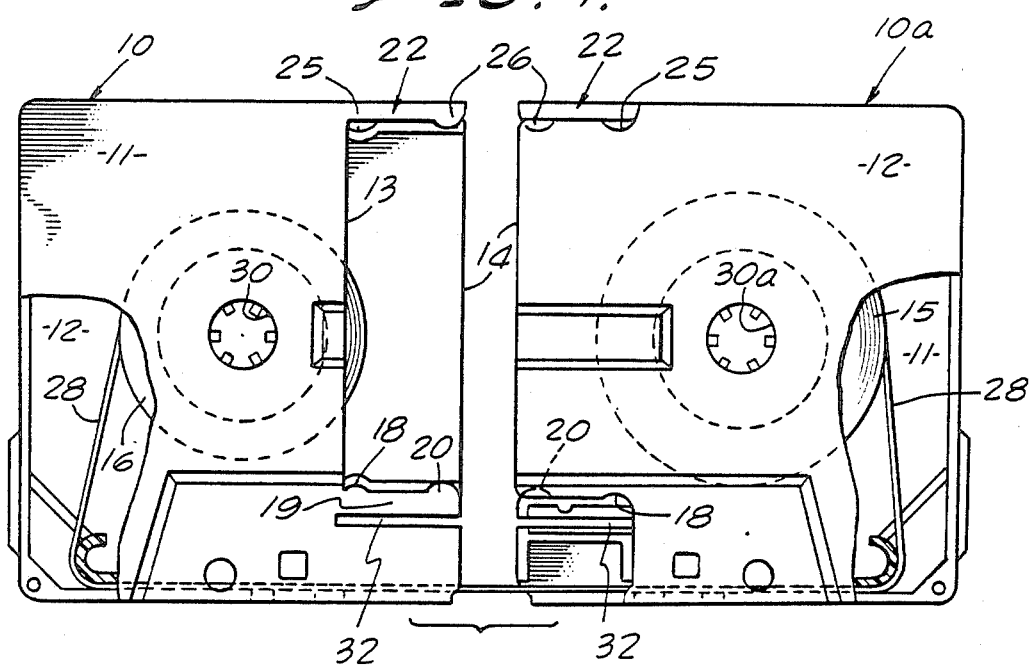
FIG. 4 is a view of the cassette, as shown in FIG. 3, but wherein the halves are fully separated.

In FIG. 3 there is illustrated the method of separating the two cassette tape halves assembled as shown in FIG. 2. As the two identical halves are pulled apart the tab ends 26 and 20 respectively at the top and bottom of the cassette assembly ride out of their respective corresponding notches, 25 and 18 releasing the halves so that the web 28 is free to be dealt with as hereinafter more fully described. When the cassette halves have been disassembled they appear as shown in FIG. 4 in a plan view. The perspective view in FIG. 1 is similar.

In the group of FIGS. 5 through 12 there is illustrated a sequence of typical operations in preparing, or modifying an audio cassette tape in accordance with this invention. It should be clear that while these illustrations are shown with a typical cassette as used in the audio or computer field, similar processes can be applied to video tape cassettes as well as to photographic film cassettes, fabricated so as to be assemblable or dissassemblable, according to this invention. It should further be clear that whatever web format is used in the cassette, inserts can be spliced into either of the identical halves in their respective mirror-image positions to assemble a program, or remove portions from either of the identical mirror image halves and reassemble the halves to form a complete cassette as hereinabove described. The audio, video, computer or film cassettes would in any case be identical halves which are so constructed as to be assembled mirror image fashion as previously described.

Figure 5:
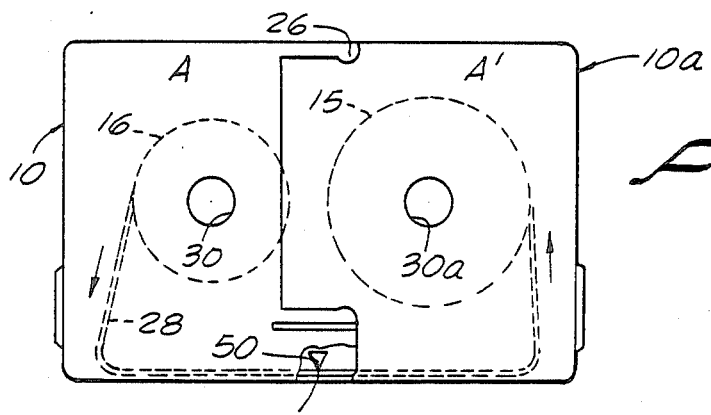
FIG. 5 through FIG. 12 inclusive comprise a series of illustrations to show sequential steps in the use of the separable cassette assemblies employing different halves to assemble a program or programs according to the invention herein.
Figure 7:
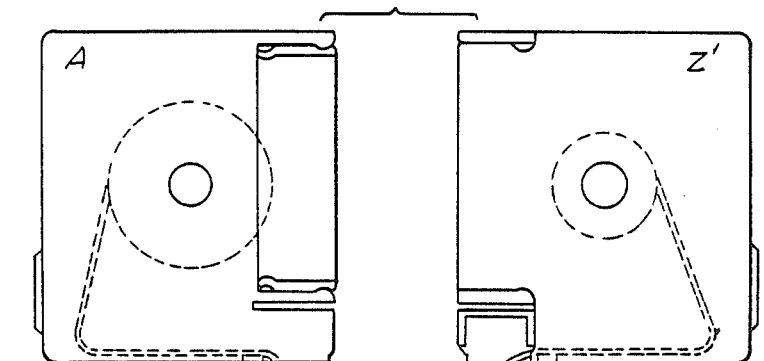
Figure 8:
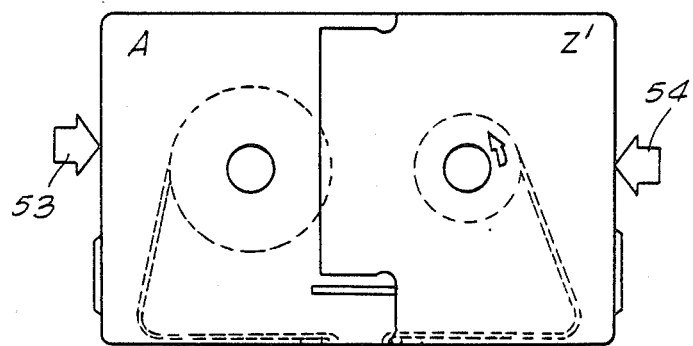

In FIG. 5 there is shown a pair of cassette halves according to the invention herein identified as A and A' respectively. Within the assembled halves as also shown in FIG. 2 there is a recorded tape web 28 which has been played through from reel 30 on half A to reel 30a on half A'. These reels correspond to reels 15 and 16 illustrated in FIG. 1. At 50 on tape web 28 one would find the beginning of a recorded song or other program item. It will be assumed that the operator wishes to add the material recorded on cassette half A to cassette half Z' (FIG. 7). To do so the web 28 will be cut as shown at 51, 52 in FIG. 6. Cutting the web as in FIG. 6 involves the separation of the halves A and A' in the manner illustrated in FIG. 3 by simply pulling them apart so that the web 28 is free and can be easily cut as indicated at 51,52 in FIG. 6. Another cassette half Z', identical with A, and capable of being assembled to cassette half A in mirror image configuration as described above, having a leader or a previously recorded web 28z' can now be spliced to web 28 in cassette half A as shown in FIG. 7. When the splice is completed as shown in FIG. 8 the halves A and Z' can be pushed together as shown by arrows 53, 54. Now the reassembled cassette can be played through on any appropriate player.

Figure 6:
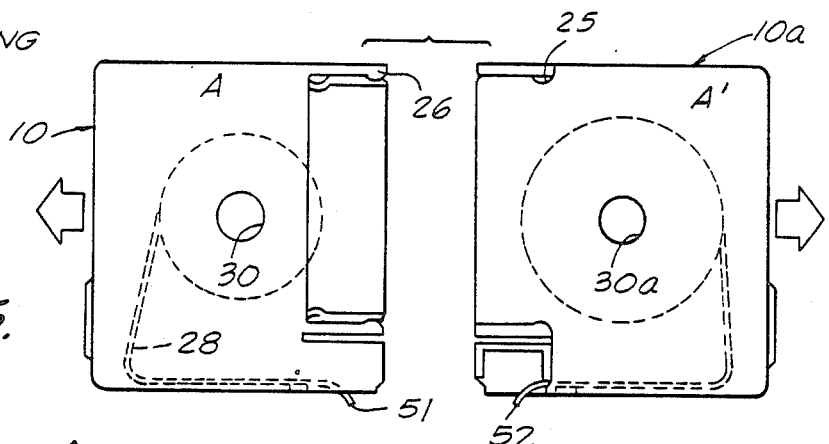
Figure 9:
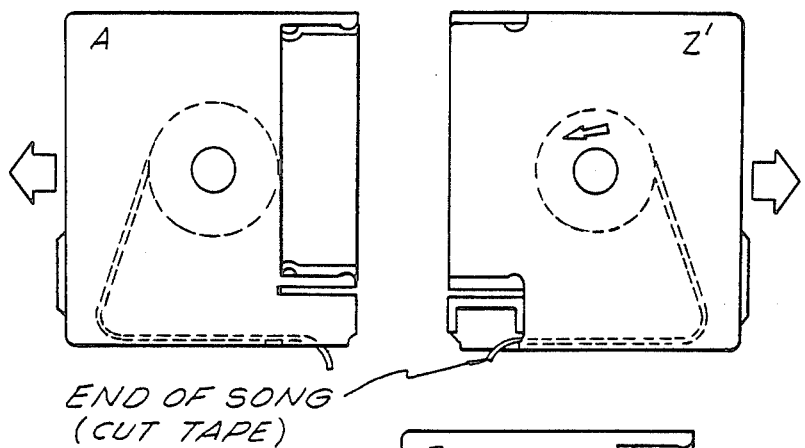
Figure 10:
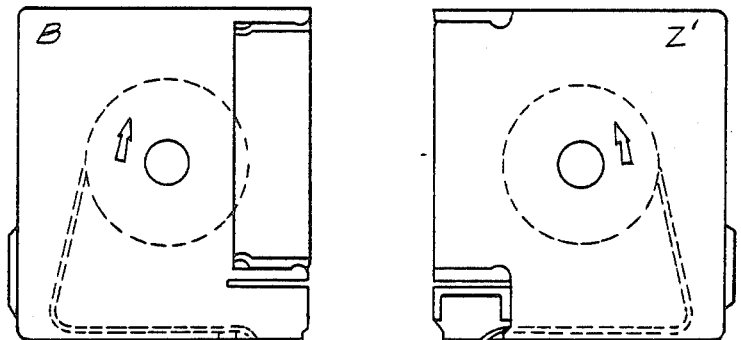
Figure 11:
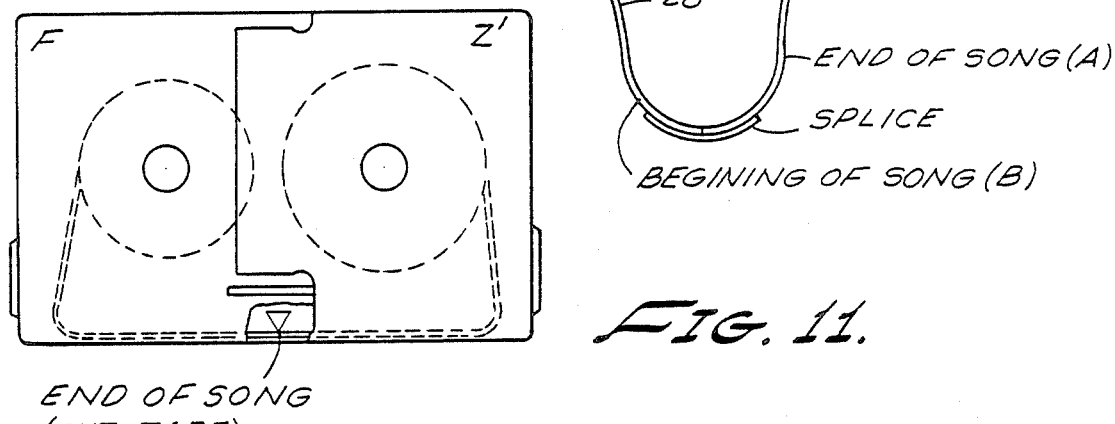
Figure 12:
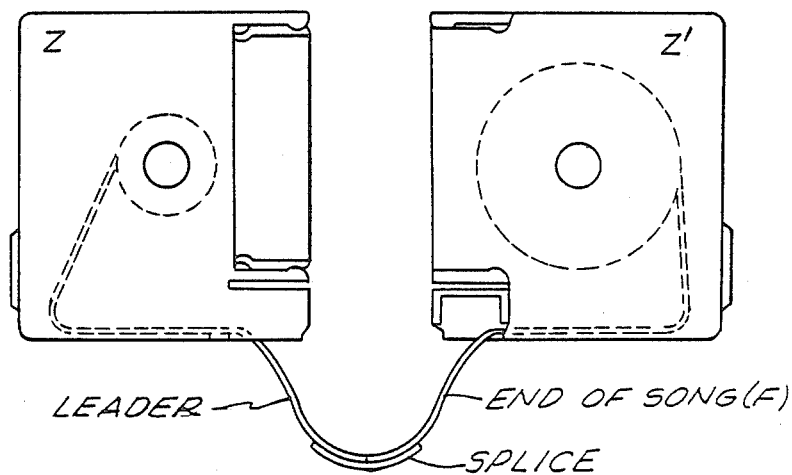

Again, in FIG. 9 the process of FIGS. 5 and 6 is repeated to disassemble cassette half A from cassette half Z', and the webs of each cut so that a new song section or other program item, on cassette half, B, may be spliced in, as shown in FIG. 10, forming a new assembly of cassette halves B and Z'. In FIG. 11 a later reassembly of cassette halves is illustrated consisting of halves F and Z' which can now be cut to attach a final leader cassette half Z as shown in FIG. 12 to cassette half Z'. When cassette halves Z and Z' are assembled together in the same manner as illustrated in FIG. 8 a final cassette assembly Z-Z' is reached which contains the material from cassette halves A, B, F and Z.

It should be clear from the preceding illustrative example that recorded material on any identical cassette tape half, as described hereinabove, can be spliced to material on any other identical cassette half so as to assemble language exercises, teaching aids of any type, or any combination of sound, video, computer or film material from respective identical cassette halves each of which has the resilient tabs and matching recepticle notches as described hereinabove. In addition the cassette halves A, B and F can be reused to assemble other program or teaching material combinations, as desired.

What is claimed as new is:

1. A thin film web container assembled from two identical halves separable along a central vertical line, each of said halves comprising:
    a front section on which there is a flexible extension at the top thereof, said top extension having a downward projecting semicircular tab at the end thereof, said front section also having a bottom flexible extension with an upwardly projecting semicircular tab thereon;

a rear section attached to said front section, said rear section extending beyond said front section and including in the top and bottom thereof semicircular indentations matching said upwardly and said downwardly projecting semicircular tabs, so that when an identical pair of halves are assembled together, said downwardly and said upwardly extending semicircular tabs on said front section of said front half engage said semicircular indentations of said rear section of the other half to hold the identical halves together in mirror image fashion; and each of said halves including between their front and back sections a reel rotatably disposed therein to hold a thin film web rolled up thereon, said identical halves being easily separable by pulling the halves apart against the flexible extensions engaged in the indentations, so that said web may be accessed to insert or delete portions thereof as desired.

2. The method of providing easily editable film web cassettes comprising the steps of:
 a. producing pairs of identical web container halves which can be interfitted laterally side-by side with one another to provide an integrated cassette unit;
 b. installing in said integrated cassette a film web which normally is transported between said integrated halves to play the program on said web;
 c. providing identical resilient holding means in each of said integrated halves to permit easy separation of said integrated halves by applying a pull along a horizontal axis of the assembled cassette, and which similarly permit reassembly by pressing the halves together along the horizontal axis of the cassette; and
 d. exposing said film web when said halves are separated so that the web may be cut and subsequently respliced to said film web in the same cassette half after removing a program portion of the web and/or spliced to the film web in another identical cassette half so that different program material may be added to the web in said same half.

3. A separable web container consisting of:

a pair of identical container halves separable laterally along a vertical line of separation;

each of said identical container halves having respectively, a resilient tab extension on one edge thereof, and a receptacle on the opposite edge thereof, adapted to receive and to interfit with an identical resilient tab on the other identical container half to permit easy, lateral pulling apart of said halves against the resilient urge of said tab on said one half in the receptacle of said other half; and each of said identical halves including a web therein on an identical rotatable reel, so that when said pair of identical web container halves is assembled together in lateral mirror image juxtaposition, they form a complete web container, being held together by said tabs of the respective one half interfitting with said receptacles of the respective other half, in which when the separate webs in each of the container halves are spliced together they form a continuous web, and whereby the halves may be separated laterally so that the web may be cut and at least one half can be replaced with an identical other half containing a different web.

4. The separate identical-half web containers defined in claim 3, wherein each of said identical halves has recorded on said webs therein a different program element, or program, which, when spliced together with the webs on any other identical cassette half with program material, the assembled halves perform as a single program.

* * * * *